United States Patent
Lee et al.

(10) Patent No.: US 9,769,811 B2
(45) Date of Patent: Sep. 19, 2017

(54) METHOD FOR RECEIVING DOWNLINK CONTROL INFORMATION IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., SEOUL (KR)

( * ) Notice: Subject to any disclaimer, the term of this patent is extended or adjusted under 35 U.S.C. 154(b) by 236 days.

(21) Appl. No.: 14/423,678

(22) PCT Filed: Sep. 17, 2013

(86) PCT No.: PCT/KR2013/008440
§ 371 (c)(1),
(2) Date: Feb. 24, 2015

(87) PCT Pub. No.: WO2014/058162
PCT Pub. Date: Apr. 17, 2014

(65) Prior Publication Data
US 2015/0230210 A1    Aug. 13, 2015

Related U.S. Application Data

(60) Provisional application No. 61/702,233, filed on Sep. 17, 2012, provisional application No. 61/706,082, filed on Sep. 26, 2012.

(51) Int. Cl.
*H04W 4/00* (2009.01)
*H04W 72/04* (2009.01)
(Continued)

(52) U.S. Cl.
CPC ....... *H04W 72/042* (2013.01); *H04J 11/0079* (2013.01); *H04L 5/005* (2013.01);
(Continued)

(58) Field of Classification Search
CPC ... H04W 72/042; H04W 72/04; H04W 74/00; H04W 48/16; H04W 24/10;
(Continued)

(56) References Cited

U.S. PATENT DOCUMENTS

| | | | |
|---|---|---|---|
| 2011/0069772 A1* | 3/2011 | Vrzic | H04L 1/0003 375/261 |
| 2013/0003672 A1* | 1/2013 | Dinan | H04L 1/00 370/329 |

(Continued)

OTHER PUBLICATIONS

Intel Corporation, "Further Details about ePDCCH Search Space," 3GPP TSG RAN WG1 Meeting #69, R1-122651, May 2012, 5 pages.

(Continued)

*Primary Examiner* — Kiet Tang
(74) *Attorney, Agent, or Firm* — Lee, Hong, Degerman, Kang & Waimey

(57) ABSTRACT

The present invention relates to a method by which a terminal receives downlink control information in a wireless communication system and, more specifically, the method comprises the step of receiving a specific reference signal (RS) in a common search space (CSS) of an enhanced physical downlink control channel (EPDCCH), wherein the specific reference signal is punctured and transmitted when a position allocated to a first terminal in an initial access procedure cannot be commonly applied to a second terminal.

7 Claims, 10 Drawing Sheets

(51) Int. Cl.
*H04L 12/16* (2006.01)
*H04L 5/00* (2006.01)
*H04J 11/00* (2006.01)
*H04L 27/26* (2006.01)
*H04W 24/10* (2009.01)
*H04W 48/16* (2009.01)
*H04W 74/00* (2009.01)

(52) U.S. Cl.
CPC .......... *H04L 5/0007* (2013.01); *H04L 5/0048* (2013.01); *H04L 5/0053* (2013.01); *H04L 5/0064* (2013.01); *H04L 27/2656* (2013.01); *H04W 24/10* (2013.01); *H04W 48/16* (2013.01); *H04W 72/04* (2013.01); *H04W 74/00* (2013.01)

(58) Field of Classification Search
CPC ... H04L 27/2656; H04L 5/005; H04L 5/0007; H04L 5/0064; H04L 5/0053; H04L 5/0048; H04J 11/0079
See application file for complete search history.

(56) References Cited

U.S. PATENT DOCUMENTS

2013/0194931 A1* 8/2013 Lee ...................... H04L 5/0053
370/241
2013/0242882 A1* 9/2013 Blankenship ....... H04W 72/042
370/329
2013/0250880 A1* 9/2013 Liao .................... H04W 72/042
370/329
2014/0192762 A1* 7/2014 Li ..................... H04L 25/03929
370/329

OTHER PUBLICATIONS

LG Electronics, "Handling of mapping of ePDCCH in presence of other signals," 3GPP TSG RAN WG1 Meeting #69, R1-122307, May 2012, 7 pages.
Samsung, "Mapping Enhanced Control Channels," 3GPP TSG RAN WG1 #69, R1-122252, May 2012, 4 pages.
ZTE, "Handling of mapping of ePDCCH in presence of other signals," 3GPP TSG RAN WG1 Meeting #69, R1-122104, May 2012, 4 pages.
Ericsson, et al., "Mapping of ePDCCH to RE," 3GPP TSG-RAN WG1 #69, R1-122000, May 2012, 5 pages.
PCT International Application No. PCT/KR2013/008440, Written Opinion of the International Searching Authority dated Dec. 27, 2013, 23 pages.

* cited by examiner

FIG. 2
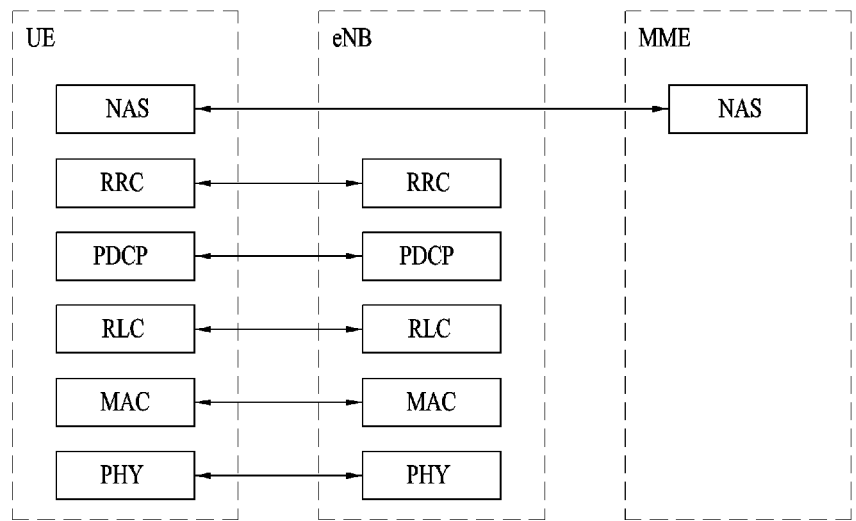
(a) contol - plane protocol stack
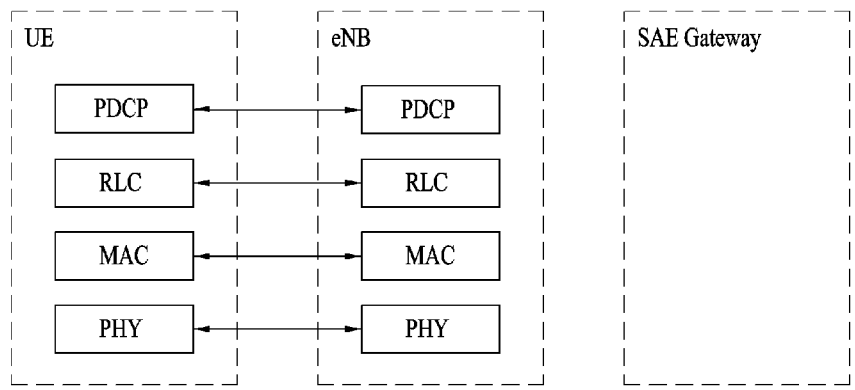
(b) user - plane protocol stack FIG. 7
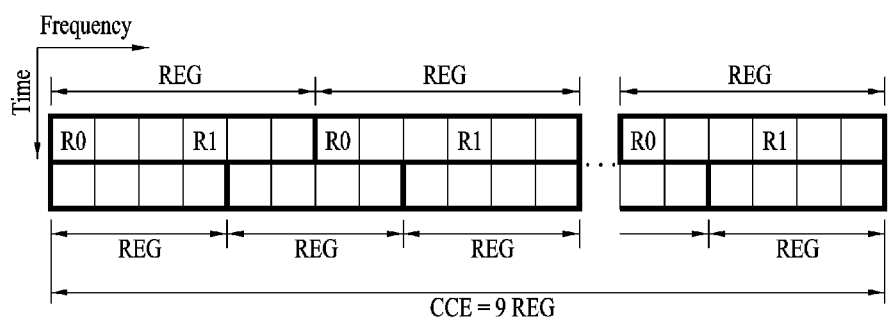
(a) 1TX or 2TX
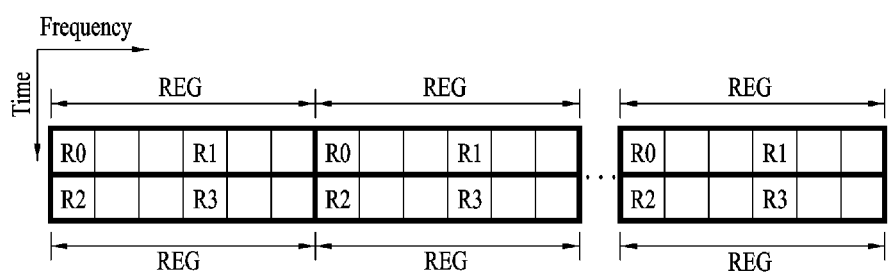
(b) 4 TX

METHOD FOR RECEIVING DOWNLINK CONTROL INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/008440, filed on Sep. 17, 2013, which claims the benefit of U.S. Provisional Application Ser. No. 61/702,233, filed on Sep. 17, 2012 and 61/706,082, filed on Sep. 26, 2012, the contents of which are all hereby incorporated by reference herein in their entirety.

TECHNICAL FIELD

The present invention relates to a wireless communication system and, more particularly, a method for receiving downlink control information by a user equipment (UE) in a wireless communication system, and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method for receiving downlink control information by a user equipment (UE) in a wireless communication system, and an apparatus therefor.

It is to be understood that both the foregoing general description and the following detailed description of the present invention are exemplary and explanatory and are intended to provide further explanation of the invention as claimed.

Technical Solution

The object of the present invention can be achieved by providing a method for receiving downlink control information by a first user equipment (UE) in a wireless communication system, the method including receiving a specific reference signal in a common search space (CSS) of an enhanced physical downlink control channel (EPDCCH), wherein the specific reference signal is transmitted using a puncturing (PC) scheme if a location allocated to the first UE in an initial access procedure is not commonly applicable to a second UE.

The specific reference signal may be a channel state information reference signal (CSI-RS).

The method may further include performing channel measurement based on the CSI-RS and transmitting a resultant value of the channel measurement.

The specific reference signal may be a CSI-RS preconfigured for channel estimation or radio resource management (RRM).

The method may further include configuration information of the specific reference signal.

The specific reference signal may be transmitted using a rate matching (RM) scheme if the location allocated to the first UE in the initial access procedure is commonly applicable to the second UE.

In another aspect of the present invention, provided herein is a method for receiving downlink control information by a user equipment (UE) in a wireless communication system, the method including receiving downlink control information of an enhanced physical downlink control channel (EPDCCH), wherein the downlink control information is received after a specific orthogonal frequency division multiplexing (OFDM) symbol location is configured as a start OFDM symbol location of a common search space (CSS) in an initial access procedure.

Control information of OFDM symbols prior to the start OFDM symbol location of the CSS may be assumed as being punctured.

In another aspect of the present invention, provided herein is a method for receiving downlink information by a user equipment (UE) in a wireless communication system, the method including receiving downlink information of an enhanced physical downlink control channel (EPDCCH), wherein the downlink control information is allocated in a first direction and a second direction based on a specific orthogonal frequency division multiplexing (OFDM) symbol location of a subframe, wherein the first direction is defined from the specific OFDM symbol location toward a last OFDM symbol of the subframe, and wherein the second direction is defined from the specific OFDM symbol location toward an initial OFDM symbol of the subframe.

The specific OFDM symbol location of the subframe may be determined using a predefined number of blind decoding operations.

In another aspect of the present invention, provided herein is a user equipment (UE) for receiving downlink information in a wireless communication system, the UE including a radio frequency (RF) unit, and a processor, wherein the processor is configured to receive a specific reference signal in a common search space (CSS) of an enhanced physical downlink control channel (EPDCCH), and wherein the specific reference signal is configured to be transmitted using a puncturing (PC) scheme if a location assigned to the UE in an initial access procedure is not commonly applicable to another UE.

Advantageous Effects

According to the present invention, a UE may efficiently receive downlink control information in a wireless communication system.

It will be appreciated by persons skilled in the art that the effects that could be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 2 is a diagram illustrating structures of a control plane and a user plane of a radio interface protocol between a user equipment (UE) and E-UTRAN based on the 3GPP radio access network standard;

FIG. 7 is a diagram illustrating a resource unit used to configure a downlink control channel in an LTE system;

BEST MODE

Figure 1:
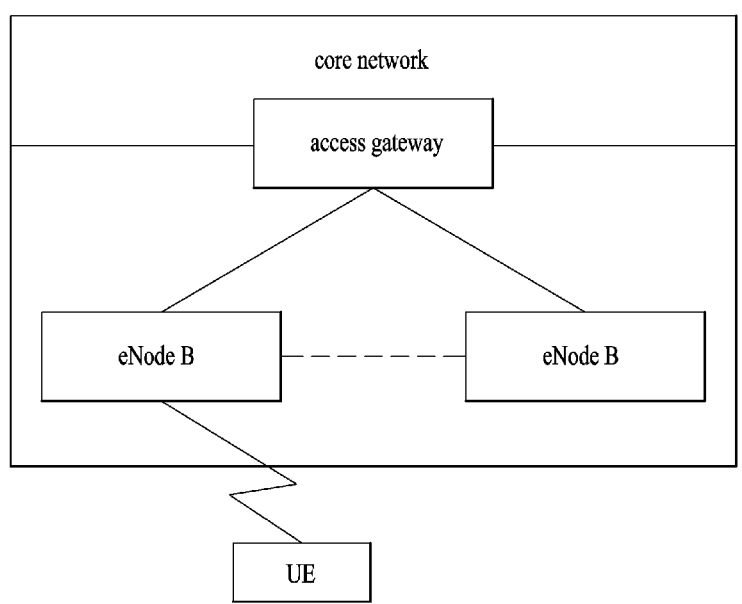
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
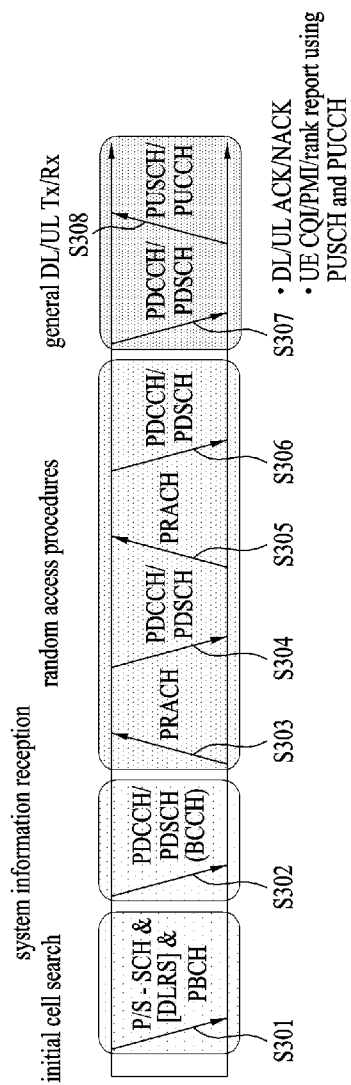
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
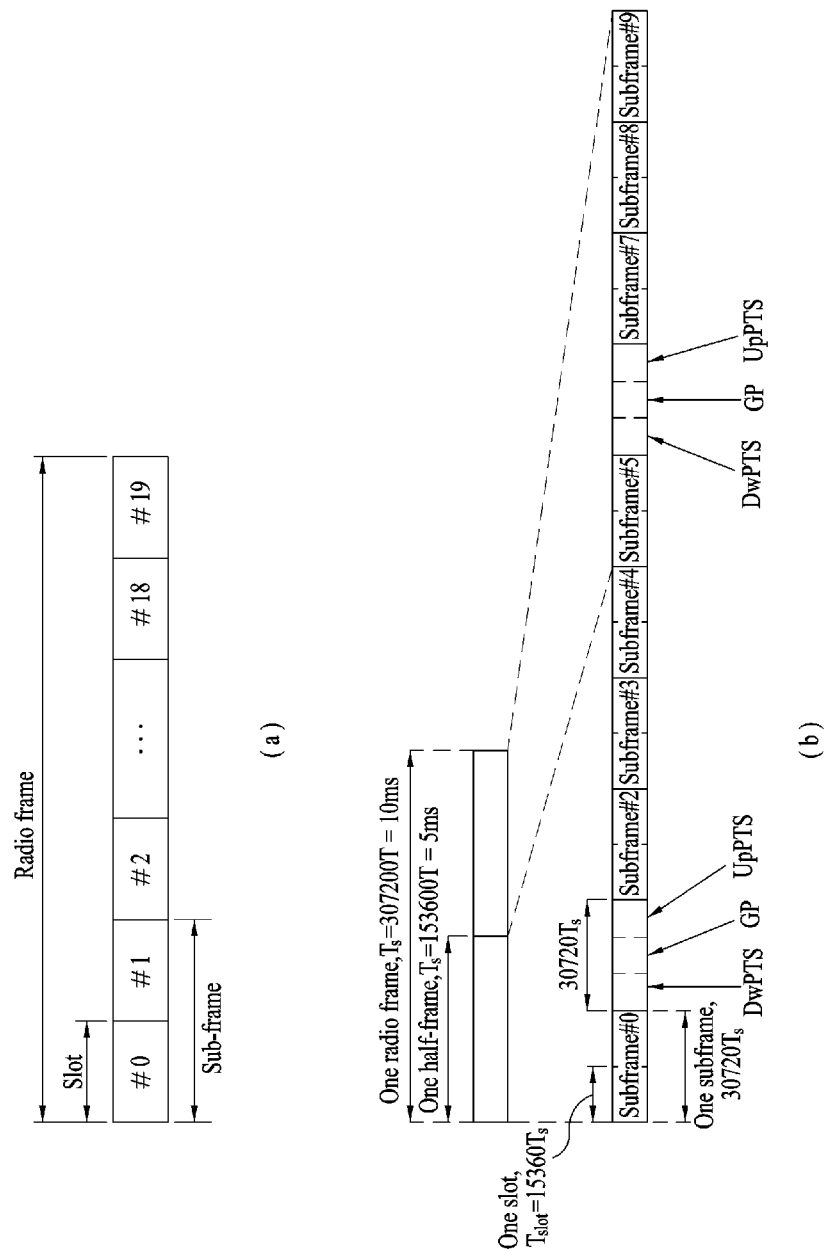
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
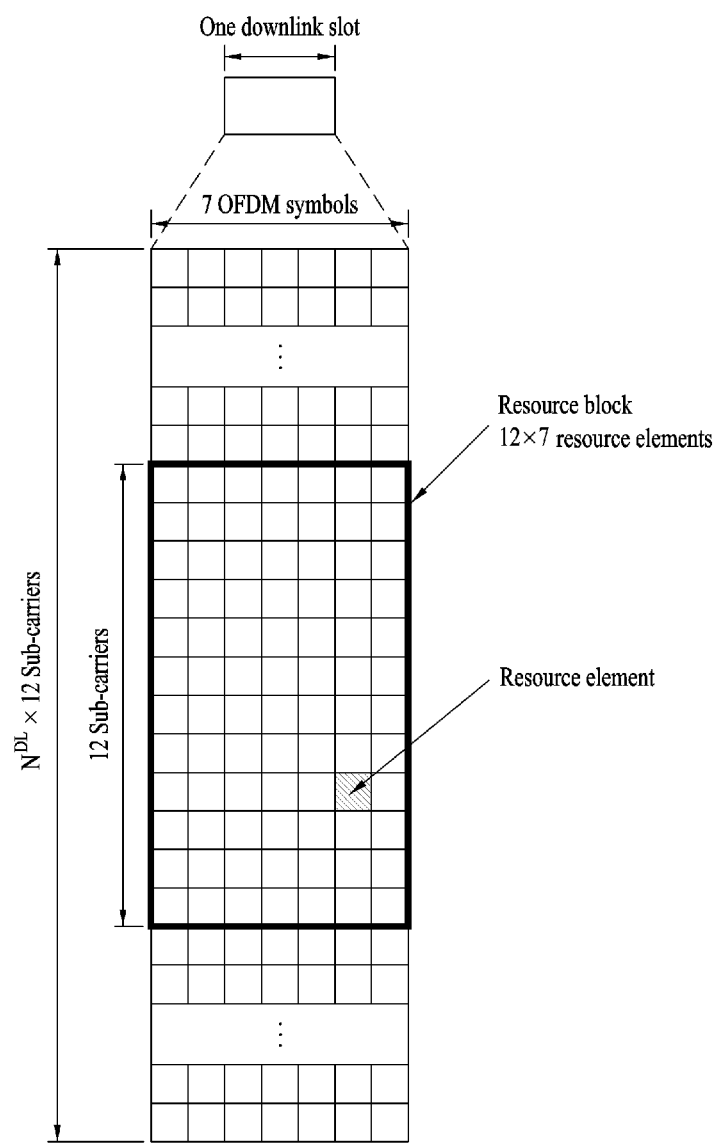
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

TABLE 1

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

Figure 6:
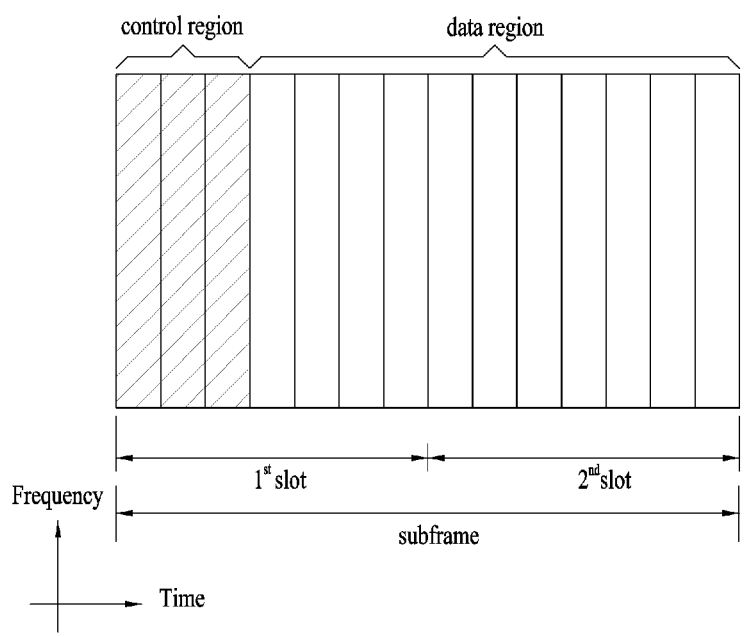
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 is a diagram illustrating a resource unit used to configure a downlink control channel in an LTE system. In particular, FIG. 7(a) illustrates that the number of transmitting antennas is 1 or 2, and FIG. 7(b) illustrates that the number of transmitting antennas is 4. Although RS patterns of FIG. 7(a) and FIG. 7(b) are different from each other in accordance with the number of transmitting antennas, a configuration method of a resource unit related to a control channel is equally applied to FIG. 7(a) and FIG. 7(b).

Referring to FIG. 7, a basic resource unit for the downlink control channel is a resource element group (REG). The REG includes four neighboring resource elements excluding the reference signal (RS). The REG is illustrated with a solid line. The PCFICH and the PHICH include four REGs and three REGs, respectively. The PDCCH is configured in a unit of CCE (control channel element), one CCE including nine REGs.

The user equipment is configured to identify $M^{(L)}(\geq L)$ number of CCEs, which are continuous or arranged in accordance with a specific rule, thereby identifying whether PDCCH of L number of CCEs is transmitted thereto. A plurality of values of L may be considered by the user equipment to receive the PDCCH. CCE aggregations that should be identified by the user equipment to receive the PDCCH will be referred to as a search space. For example, the LTE system defines the search space as illustrated in Table 1 below.

TABLE 1

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L represents the number of CCEs constituting the PDCCH, $S_k^{(L)}$ represents a search space of the CCE aggregation level L, and $M^{(L)}$ is the number of candidate PDCCH that should be monitored at the search space of the aggregation level L.

The search space may be divided into a UE-specific search space that allows access for only a specific user equipment and a common search space that allows access for all user equipments within a cell. The user equipment monitors a common search space of the CCE aggregation levels of 4 and 8, and monitors a UE-specific search space of the CCE aggregation levels of 1, 2, 4 and 8. The common search space and the UE-specific search space may be overlapped with each other.

Furthermore, in a PDCCH search space given to a random user equipment for each CCE aggregation level value, the location of the first CCE (i.e., CCE having the smallest index) is varied per subframe depending on the user equipment. This will be referred to as PDCCH search space hashing.

The CCEs may be distributed in a system band. In more detail, a plurality of CCEs which are logically continuous may be input to an interleaver. The interleaver performs interleaving for the input CCEs in a unit of REG. Accordingly, frequency/time resources constituting one CCE are physically distributed in the entire frequency/time domain within the control region of the subframe. Finally, although the control channel is configured in a unit of CCE, interleaving is performed in a unit of REG, whereby frequency diversity and interference randomization gain may be maximized.

Figure 8:
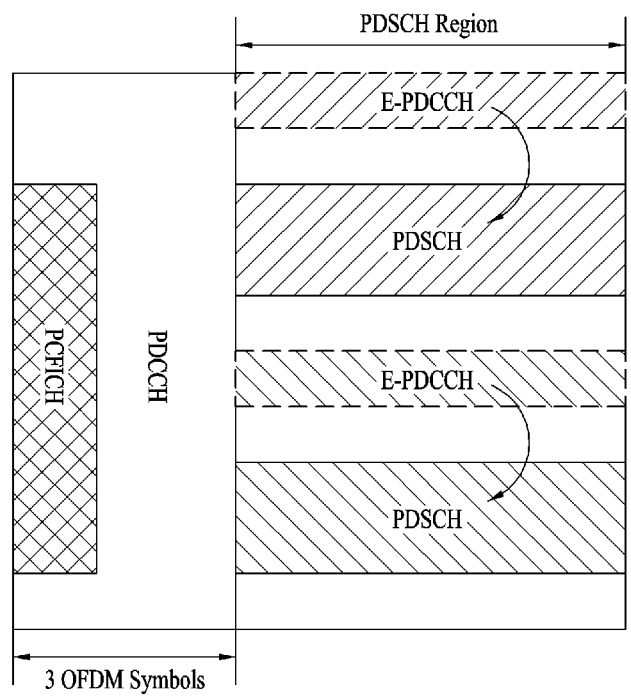
FIG. 8 is a diagram illustrating enhanced physical downlink control channels (EPDCCHs) and physical downlink shared channel (PDSCHs) scheduled by the EPDCCHs.

FIG. 8 is a diagram illustrating enhanced physical downlink control channels (EPDCCHs) and physical downlink shared channel (PDSCHs) scheduled by the EPDCCHs.

Referring to FIG. 8, parts of a PDSCH region for transmitting data may be generally defined and used as the EPDCCHs, and a UE should perform a blind decoding procedure to detect presence of an EPDCCH directed to the UE. Although the EPDCCH performs the same scheduling operation as a legacy PDCCH (i.e., PDSCH, PUSCH control), if the number of UEs connected to the same node such as a remote radio head (RRH) is increased, a larger number of EPDCCHs are allocated in the PDSCH region and thus the number of blind decoding operations which should be performed by the UE can be increased to cause high complexity.

The present invention proposes a method for efficiently configuring a search space (SS) of an EPDCCH which is a control channel transmitted in a legacy PDSCH region instead of a legacy PDCCH in an environment to which carrier aggregation (CA) is applied. Here, if an OFDM symbol used for PDCCH transmission is not present, the proposed method is also applicable to a case in which all OFDM symbols of a corresponding subframe are designated and used as the PDSCH region. Furthermore, obviously, the EPDCCH described below is also used for communication with an eNB by a relay as well as a general UE.

In the following description, for convenience of explanation, a specific channel/signal for a decoding operation based on a newly configured reference signal (e.g., modulation reference signal (DM-RS)) other than a legacy reference signal (e.g., cell-specific reference signal (CRS)), or a specific channel/signal transmitted based on a newly configured time-frequency radio resource location other than a legacy time-frequency radio resource location is denoted using prefix "E-(Enhanced-)".

In the case of an LTE system, reference signals (e.g., CRS, channel state information reference signal (CSI-RS) and DM-RS), physical control channels (e.g., PDCCH, PCFICH and PHICH), system information transmission channels (e.g., PBCH and SIB), synchronization channels (e.g., primary synchronization signal (PSS) and secondary synchronization signal (SSS)), etc. are transmitted in subframes configured for downlink transmission on a specific cell or a specific component carrier (CC). Based on this, legacy UEs can be assured of physical downlink/uplink data communication, system information reception, synchronization, etc. with/from a specific cell (i.e., backward compatibility). However, employment of a newly defined cell or CC for not transmitting all or a part of physical signals or reference signals, which have been transmitted on a cell or CC having backward compatibility to legacy UEs, is discussed for future systems to solve inter-cell interference, improve cell or CC scalability, and increase the degree of freedom in applying enhanced technologies. In the present invention, such cell or CC is defined as a new carrier type (NCT) for convenience of explanation.

For example, the NCT may be defined to transmit a low-density CRS at/in a pre-configured frequency domain location or period other than a high-density CRS transmitted in a legacy downlink system bandwidth. Here, the CRS transmitted at a low density can be defined to track synchronization of UEs in a time-frequency resource region or to determine link reliability (e.g., radio resource management (RRM) or radio link monitoring (RLM)) between an eNB and the UEs. Hereinafter, such CRS is referred to as a tracking reference signal (TRS) for convenience of explanation. Additionally, the TRS transmitted on the NCT based on a predefined specific antenna port may be configured not to be used to demodulate a physical control channel or a physical data channel.

Furthermore, the NCT may be configured to perform a physical control/data channel reception operation using only downlink data transmission modes (TMs) operating based on a DM-RS (e.g., TM mode #8 and TM mode #9) among legacy downlink data TMs.

In addition, synchronization signals (e.g., PSS and SSS) for achieving synchronization in a time-frequency resource region or various reference signals for channel estimation between the eNB and the UEs (e.g., RRM and RLM) may also be transmitted on the NCT. Here, at least one of the synchronization signals and the reference signals for channel estimation may be located in the same time domain as a legacy system, or in a newly defined time domain.

A detailed description is now given of a method for efficiently designing and operating an EPDCCH common search space (CSS) configured on an NCT when a UE performs communication based on the EPDCCH CSS. Proposals of the present invention are extensively applicable to both of FDD and TDD systems to which carrier aggregation (CA) is applied, and are extensively applicable to both of cross carrier scheduling (CCS) and non-CCS (self-scheduling). Additionally, embodiments of the present invention are extensively applicable to implement an EPDCCH UE-specific search space (USS) on an NCT.

Furthermore, the present invention is also applicable to an environment in which an NCT is configured with a legacy cell or CC having backward compatibility using carrier aggregation and an environment in which an NCT is autonomously configured without the legacy cell or CC. In addition, the present invention is extensively applicable to a case in which a time-frequency resource location of a DM-RS/PSS/SSS transmitted on an NCT is defined differently from that of a legacy LTE system (e.g., Rel-10).

Besides, embodiments of the present invention are extensively applicable to a case in which a resource configuration (e.g., PRB pair basis) for a monitored EPDCCH CSS/USS in an initial access procedure is independently configured.

The following description is focused on a case in which UEs should perform an initial access operation based on an NCT other than a cell or CC having backward compatibility. However, proposals of the present invention are extensively applicable to all cases in which an EPDCCH CSS is implemented on an NCT.

Resource Element for Control Information is Configured in CSS

A description is now given of a method for configuring valid resources (e.g., resource elements (REs)) for transmitting/acquiring control information in a CSS configured using a predefined scheme in an NCT-based initial access environment, according to the present invention. Here, the CSS is basically characterized in being commonly monitored by a plurality of UEs.

Thus, according to an embodiment of the present invention, a method for transmitting/acquiring control information of various reference signals or system information signals transmitted in a CSS region of an NCT may be differently configured depending on whether all (or specific-group) UEs can commonly assume the locations of the signals. For example, signals which can be assumed as having common locations by a plurality of UEs may be configured to transmit control information using a rate matching (RM) scheme, and signals which cannot be assumed as having common locations by a plurality of UEs may be configured to transmit control information using a puncturing (PC) scheme. Here, such information (e.g., signal types to which an RM/PC scheme is applied) may be signaled by an eNB to UEs using a predefined signal (e.g., EPBCH or ESIB), or may be implicitly assumed based on a predefined rule.

According to an embodiment of the present invention, it is assumed that signals such as primary synchronization signal (PSS)/secondary synchronization signal (SSS) for time-frequency synchronization, tracking reference signal (TRS) for synchronization tracking, PBCH/EPBCH for system information transmission, and default CSI-RS are transmitted from an NCT-based specific transmission point (TP) or eNB. Here, the default CSI-RS refers to a predefined specific CSI-RS configuration for channel estimation or a specific CSI-RS configuration for RRM (e.g., reference signal received power (RSRP) or reference signal received quality (RSRQ)), and configuration information of the default CSI-RS may be transmitted via a pre-designated system information transmission channel (e.g., EPBCH or ESIB) or assumed based on a rule. Since such signals are probably transmitted at common locations to all UEs which perform an initial access procedure or a handover procedure, or have completed the initial access procedure, control information of those signals in a CSS may be configured as being transmitted using an RM scheme.

Here, configuration information about time resource/frequency resource/antenna port count/antenna port number for transmitting these signals, or configuration information of a DM-RS used to decode a specific signal based on an NCT may be transmitted via a pre-designated system information transmission channel (e.g., EPBCH or ESIB) or assumed based on a rule. In addition, the control information in the CSS may be transmitted using an RM scheme only at timings when the signals are actually transmitted, or transmitted using an RM scheme on the assumption that the signals are transmitted all the time.

Alternatively, the control information in the CSS may be transmitted based on a predefined data transmission scheme (e.g., spatial diversity) or an EPDCCH type (e.g., distributed EPDCCH). To this end, DM-RS overhead or DM-RS antenna port configuration/count (e.g., AP #7, AP #9) for transmission and decoding of the control information in the CSS may be commonly assumed by all UEs. Likewise, the control information of the DM-RS in the CSS may be transmitted using an RM scheme.

On the other hand, in the case of CSI-RS, all UEs may not have a common configuration. For example, in a cooperative communication environment among a plurality of TPs having the same physical cell ID (i.e., CoMP Scenario #4), TPs participating in cooperative communication of a specific UE may be differently configured (e.g., selectable based on RSRP of each TP which is measured by the specific UE), and the specific UE may report a channel measurement value for each TP based on different CSI-RS configurations configured per TP participating in cooperative communication of the UE. Thus, it is noted that CSI-RS configurations configured per UE in this environment are not the same. Accordingly, the control information of the CSI-RS in the CSS may be transmitted using a PC scheme.

Additionally, the above-described default CSI-RS may also be transmitted using a PC scheme in consideration of interference in a corresponding control information decoding operation due to a variation in a start OFDM symbol location of the EPDCCH CSS/USS. For example, information about CSI-RS configuration(s) to which a PC scheme is applied or default CSI-RS configuration(s) to which a PC scheme is applied may be signaled by an eNB to UEs using a predefined signal (e.g., EPBCH or ESIB), or may be implicitly assumed based on a predefined rule. In addition, the control information in the CSS may be transmitted using a PC scheme only at timings when the CSI-RS signal(s) or the default CSI-RS signal(s) are actually transmitted, or transmitted using a PC scheme on the assumption that the signal(s) are transmitted all the time.

Method for Configuring Start OFDM Symbol Location of CSS

The present invention also proposes a method for efficiently configuring a start OFDM symbol location of a CSS in an NCT-based initial access environment.

According to an embodiment of the present invention, UEs performing an initial access operation may assume the start OFDM symbol location of the CSS as a pre-configured fixed value. For example, the start OFDM symbol location of the CSS assumed by the UEs in the initial access operation may be configured as a relatively large OFDM symbol index value (e.g., the fourth OFDM symbol index of the first slot) in consideration of interference from PDCCH channel regions of legacy cells or CCs (e.g., case in which the NCT and the legacy cells or CCs use the same-location band). Here, according to another embodiment of the present invention, the start OFDM symbol index of the CSS may be signaled by an eNB to the UEs using a predefined signal (e.g., EPBCH or ESIB).

Furthermore, when the start OFDM symbol location of the CSS is assumed as a pre-configured fixed value (or a value configured using a predefined signal), the UEs may assume that the eNB maps control information in the CSS from the first OFDM symbol but control information in OFDM symbols prior to the configured start OFDM symbol location of the CSS is punctured. Based on this assumption, the UEs may decode the control information in the CSS in the initial access operation.

As another method, the eNB may (additionally) signal an accurate (or actual) start OFDM symbol location of the CSS to the UEs having completed the initial access procedure (e.g., UEs in RRC connected mode) through higher layer signaling (e.g., RRC signaling), and the UEs having received this information may decode the control information in the CSS based on the updated information other than the previous start OFDM symbol location of the CSS (e.g., the location assumed in the initial access operation).

Here, after the UEs have completed the initial access procedure, if the additionally received start OFDM symbol index of the CSS is smaller than the previously assumed start OFDM symbol index of the CSS (i.e., the start OFDM symbol index assumed in the initial access procedure), the UEs and the eNB reuse a resource (e.g., resource element (RE), which are assumed as being punctured in the initial access procedure, to transmit the control information.

Furthermore, if the UEs assume the start OFDM symbol location of the CSS as a pre-configured fixed value, or if the eNB (additionally) signals an accurate (or actual) start OFDM symbol location of the CSS to the UEs having completed the initial access procedure (e.g., UEs in RRC connected mode) through higher layer signaling (e.g., RRC signaling), the eNB and the UEs may assume that the control information in the CSS is mapped from the first OFDM symbol but control information in OFDM symbols prior to the configured start OFDM symbol location of the CSS is punctured. Puncturing of the control information in the OFDM symbols prior to the start OFDM symbol location of the CSS as described above is helpful to maintain the performance of operation for decoding the control information by the UEs performing the initial access operation if the UEs do not have accurate information about the start OFDM symbol location of the CSS.

In the present invention, the range of downlink control information (DCI) in a CSS to which the above-described proposals are applied may be restricted to DCI types which should be monitored for initial access or DCI types which should be monitored even when the UEs are in idle mode. Here, the DCI types which should be monitored even when the UEs are in idle mode may include, for example, DCI masked with SI-RNTI/P-RNTI/RA-RNTI. However, even in this case, DCI format 3/3A received in RRC connected mode may be configured as an exception.

Resource Element Mapping in Consideration of Puncturing

Another embodiment of the present invention proposes a method for reducing influence of puncturing on systematic bit(s) of control/data information (i.e., encoded bit(s)) generated based on a specific code (e.g., systematic code) when control/data information is transmitted via a control/data channel and control/data information in OFDM symbols prior to a pre-configured start OFDM symbol location of the channel is punctured.

Specifically, the present invention proposes a method for mapping encoded bit(s) of control/data information in directions toward the start or the end of a subframe based on a pre-configured start OFDM symbol location, considering that control/data information in OFDM symbols prior to the start OFDM symbol location of a specific channel is punctured.

Figure 9:
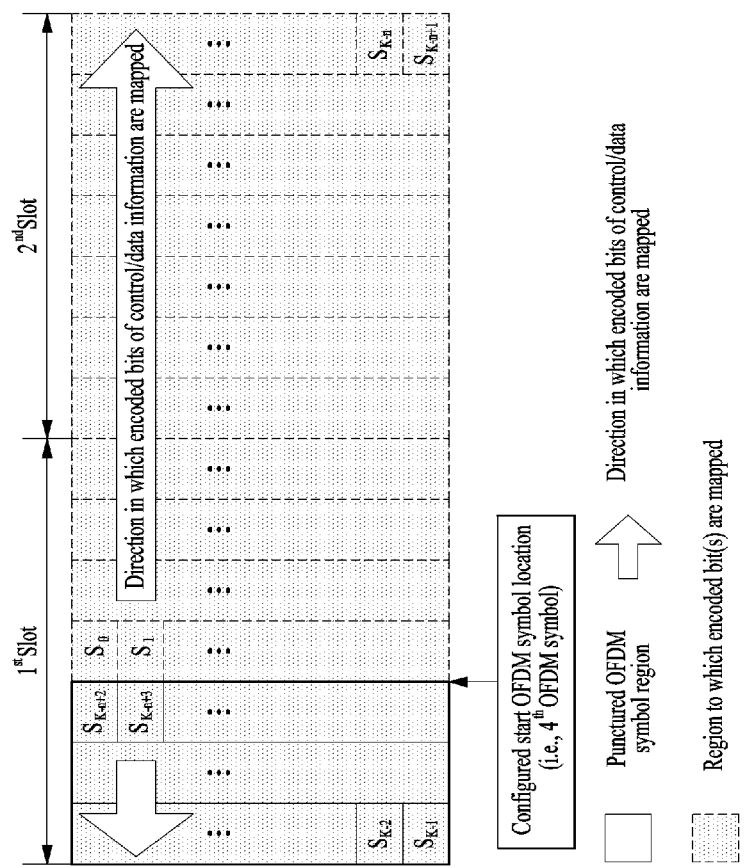
FIG. 9 is a diagram illustrating a method for mapping resources in consideration of puncturing according to an embodiment of the present invention.

A description thereof according to an embodiment of the present invention is now given with reference to FIG. 9. In FIG. 9, encoded bit(s) acquired from a specific code are assumed as '$S_0, S_1, \ldots, S_{K-2}, S_{K-1}$' (i.e., K bits), and systematic bit(s) of the encoded bit(s) and remaining parity bit(s) are assumed as '$S_0, S_1, \ldots, S_{k-P-2}, S_{k-P-1}$' (i.e., (K-P) bits) and '$S_{K-P}, S_{K-P+1}, \ldots, S_{K-2}, S_{K-1}$' (i.e., P bits), respectively.

As shown in FIG. 9, according to an embodiment of the present invention, if the encoded bit(s) of the control/data information are mapped in directions toward the start or the end of a subframe based on the start OFDM symbol location (i.e., the fourth OFDM symbol), influence of puncturing on the systematic bit(s) (i.e., '$S_0, S_1, \ldots, S_{k-P-2}, S_{K-P1}$' (i.e., (K-P) bits)) of the encoded bit(s) of the control/data information may be relatively reduced. Furthermore, this embodiment is equally applicable not only to a control channel (e.g., EPDCCH CSS/USS) but also to a data channel (e.g., PDSCH) or a system information transmission channel (e.g., EPBCH or ESIB) scheduled by the control channel.

UEs performing an initial access operation receive a relatively large amount of information (e.g., system information) by performing blind decoding on a CSS other than a USS. Accordingly, in the present invention, when the UEs perform the initial access operation, the UEs may be configured to check the start OFDM symbol location of the CSS by performing blind decoding a predefined number of times, using a fact that the number of blind decoding operations to be performed on the USS is relatively small.

Here, when the above proposal is applied to the start OFDM symbol location of the CSS, an eNB and the UEs may transmit control information in the CSS using only available resources from the start OFDM symbol location of the CSS based on an RM scheme.

Additionally, to allow the UE to determine whether blind decoding for checking the start OFDM symbol location of the CSS is successfully performed by the UE, the eNB may be configured to transmit actually configured start OFDM symbol location information of the CSS by masking the information with specific CRC of DCI (or C-RNTI, SI-RNTI, P-RNTI, RA-RNTI or the like).

When NCT-based communication is performed, a specific CSI-RS configuration (i.e., 'default CSI-RS configuration') for channel estimation or for RRM (e.g., RSRP or RSRQ) may be signaled to the UEs via a pre-designated system information transmission channel (e.g., EPBCH or ESIB). Alternatively, a specific CSI-RS configuration for channel estimation or for RRM (e.g., RSRP or RSRQ) may be assumed by the UEs based on a rule. In the present invention, when the above-described method is applied, the default CSI-RS configuration for channel estimation or for RRM may be quasi co-located with at least one of a DM-RS used to decode an EPDCCH CSS, a DM-RS used to decode a data/system information channel (i.e., PDSCH/EPBCH/ESIB/random access response (RAR)) scheduled by the EPDCCH CSS, and a DM-RS used to decode a system information channel (i.e., EPBCH/ESIB).

Accordingly, if the above-described present invention is applied, the UEs may improve the accuracy of estimating large-scale properties (i.e., frequency offset (shift), delay spread, received timing, received power and Doppler spread) of a DM-RS transmitted at a lower density than a legacy CRS, using another reference signal having quasi co-location characteristics (i.e., default CSI-RS configuration). Alternatively, the eNB may signal information about a DM-RS used to decode a specific channel and a quasi co-located CSI-RS to the UEs using a predefined signal (e.g., EPBCH, ESIB or new-format DCI having a related information transmission field).

Control Information Transmission in Consideration of CSI-RS Transmitted in EPDCCH CSS/USS The present invention also proposes a method for efficiently transmitting control information in consideration of a CSI-RS transmitted in an EPDCCH CSS/USS in an NCT-based initial access environment. According to an embodiment of the present invention, UEs performing an initial access operation to a specific cell may assume that control information in an EPDCCH CSS/USS is transmitted using a PC or RM scheme based on a CSI-RS configuration signaled from an eNB to the UEs using a predefined signal (e.g., EPBCH or ESIB) or a CSI-RS configuration implicitly assumed based on a predefined rule.

Here, for example, when the eNB signals a CSI-RS configuration to the UEs via a predefined system information transmission channel (e.g., EPBCH or ESIB), if information bits necessary for a legacy CSI-RS configuration are equally used, signaling overhead of the system information transmission channel is increased.

TABLE 4

CSI-RS-Config information elements

```
-- ASN1START
CSI-RS-Config-r10 ::=      SEQUENCE {
    csi-RS-r10             CHOICE {
        release            NULL,
        setup              SEQUENCE {
            antennaPortsCount-r10   ENUMERATED {an1, an2, an4, an8},
```

TABLE 4-continued

CSI-RS-Config information elements

```
            resourceConfig-r10      INTEGER (0..31),
            subframeConfig-r10      INTEGER (0..154),
            p-C-r10                 INTEGER (-8..15)
         }
    }                                             OPTIONAL,   -- Need ON
    zeroTxPowerCSI-RS-r10    CHOICE {
         release                 NULL,
         setup                   SEQUENCE {
            zeroTxPowerResourceConfigList-r10     BIT STRING (SIZE (16)),
            zeroTxPowerSubframeConfig-r10         INTEGER (0..154)
         }
    }                                             OPTIONAL    -- Need ON
}
-- ASN1STOP
```

TABLE 5

| CSI-RS-Config field descriptions |
| --- |
| antennaPortsCount |
| Parameter represents the number of antenna ports used for transmission of CSI reference signals where value an1 corresponds to 1 antenna port, an2 to 2 antenna ports and so on, see TS 36.211 [21, 6.10.5]. |
| p-C |
| Parameter: $P_c$, see TS 36.213 [23, 7.2.5]. |
| resourceConfig |
| Parameter: CSI reference signal configuration, see TS 36.211 [21, table 6.10.5.2-1 and 6.10.5.2-2]. |
| subframeConfig |
| Parameter: $I_{CSI-RS}$, see TS 36.211 [21, table 6.10.5.3-1]. |
| zeroTxPowerResourceConfigList |
| Parameter: ZeroPowerCSI-RS, see TS 36.213 [23, 7.2.7]. |
| zeroTxPowerSubframeConfig |
| Parameter: $I_{CSI-RS}$, see TS 36.211 [21, table 6.10.5.3-1]. |

Tables 4 and 5 show an example of information bits of a legacy CSI-RS configuration transmitted through higher layer signaling. Here, as shown in Table 4, the information bits of the legacy CSI-RS configuration largely include antenna port configuration information of CSI-RS signals (i.e., antennaPortsCount-r10), information about locations where CSI-RS signals based on a specific antenna port configuration are transmitted in physical resource regions (e.g., PRBs) (i.e., resourceConfig-r10; see the 3GPP standard document, i.e., 3GPP TS 36.211 V11.0.0 6.10.5.2 Mapping to resource elements, for the locations of other resource elements in which the CSI-RS signals based on the specific antenna port configuration are transmitted), information about a period/subframe offset for CSI-RS transmission (i.e., subframeConfig-r10), and information about a CSI-RS transmit power configuration (i.e., p-C-r10).

Table 6 shows an example of the information about the locations where the CSI-RS signals based on the specific antenna port configuration are transmitted in the physical resource regions (i.e., resourceConfig-r10).

TABLE 6

| | | Number of CSI reference signals configured | | | | | |
| --- | --- | --- | --- | --- | --- | --- | --- |
| CSI reference | | 1 or 2 | | 4 | | 8 | |
| signal configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 7 shows an example of the information about the period/subframe offset for CSI-RS transmission (i.e., subframeConfig-r10).

TABLE 7

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Here, $T_{CSI-RS}$ denotes information about a subframe period for CSI-RS transmission, $\Delta_{CSI-RS}$ denotes information about a subframe offset for CSI-RS transmission. Accordingly, the information about the period/subframe offset for CSI-RS transmission may be acquired using a CSI-RS subframe configuration $I_{CSI-RS}$. Furthermore, $I_{CSI-RS}$ may be independently configured in consideration of non-zero transmit power and zero transmit power of CSI reference signals for UEs. Here, subframes including the CSI reference signals satisfy $(10\ n_f + \lfloor n_s/2 \rfloor - \Delta_{CSI-RS}) \bmod T_{CSI-RS} = 0$. Here, $n_s$ denotes a slot number within a radio frame, and $n_f$ denotes a system frame number.

Accordingly, the present invention proposes a method for transmitting CSI-RS configuration information from an eNB to UEs performing an initial access procedure via a system information transmission channel (e.g., EPBCH or ESIB) with relatively low signaling overhead by efficiently reducing bits required to transmit legacy CSI-RS configuration information based on a predefined rule. The UEs having received the CSI-RS configuration information may assume that control information of corresponding CSI-RS signals in an EPDCCH CSS/USS is transmitted/received using a PC or RM scheme based on a predefined rule. Alternatively, the UEs having received the CSI-RS configuration information may assume that control information of corresponding CSI-RS signals in the EPDCCH CSS/USS is transmitted/received using a PC or RM scheme signaled via the system information transmission channel (e.g., EPBCH or ESIB).

Furthermore, according to an embodiment of the present invention, the number of bits required to transmit corresponding information (resourceConfig-r10, 6 bits) may be reduced by grouping candidate locations in physical resource regions where CSI-RS signals based on a specific antenna port configuration is transmittable. When the candidate locations are grouped, for example, a location in an independent physical resource region may be configured as a representative candidate or a location in the grouped physical resource regions may be configured as a representative candidate.

For example, in Table 6, a total number of candidate locations in physical resource regions where CSI-RS signals based on one or two antenna ports (i.e., Antenna Port (AP) #15 or APs #15 and #16) are transmittable is 32 (i.e., CSI reference signal configurations #0 to #31). However, if the candidate locations are sequentially grouping based on a predefined number (e.g., 4) as proposed by the present invention, the number of bits required to transmit corresponding information may be reduced (i.e., '5 bits→3 bits'). Accordingly, the UEs having received grouped CSI-RS configuration information (i.e., CSI-RS transmission locations in physical resource regions) via the system information transmission channel (e.g., EPBCH or ESIB) may assume that control information of a plurality of grouped CSI-RS signals in the EPDCCH CSS/USS is transmitted/received using a PC or RM scheme based on a predefined rule, or transmitted/received using a PC or RM scheme signaled via the system information transmission channel.

Alternatively, according to another embodiment of the present invention, the number of bits required to transmit corresponding information (antennaPortsCount-r10, 2 bits) may be reduced by configuring specific ones of antenna port count/number candidates used for CSI-RS transmission as representative candidates (e.g., even 1 antenna port count/number candidate can be configured as a representative candidate) based on a predefined rule.

For example, in Table 6, a total number of antenna port count/number candidates usable for CSI-RS transmission is 4 (i.e., 'Number of CSI reference signals configured=1/2/4/8 (i.e., APs #15 to #22)'). However, if specific antenna port count/number candidates (i.e., 'Number of CSI reference signals configured=4/8 (i.e., APs #15 to #22)') are configured as representative candidates as proposed by the present invention, the number of bits required to transmit corresponding information may be reduced (i.e., '2 bits→1 bit'). As another example, in Table 6, a specific one of the antenna port count/number candidates usable for CSI-RS transmission may be configured as a representative candidate. Specifically, in Table 6, 'Number of CSI reference signals configured=8 (i.e., APs #15 to #22)' may be configured as a representative candidate (of antenna port count/number) used for CSI-RS transmission.

That is, the UEs having received CSI-RS configuration information for selecting representative candidates (i.e., antenna port count/number) via the system information transmission channel (e.g., EPBCH or ESIB) may assume that control information in the EPDCCH CSS/USS for corresponding CSI-RS antenna port count/number overhead is transmitted/received using a PC or RM scheme based on a predefined rule, or transmitted/received using a PC or RM scheme signaled via the system information transmission channel. Furthermore, if the representative candidate(s) of antenna port count/number used for CSI-RS transmission are defined as described above, since candidate locations in physical resource regions where CSI-RS signals based on the representative antenna port count/number candidate(s) are transmittable are restricted in Table 6, the number of information bits for signaling the CSI-RS transmission locations in the physical resource regions may also be reduced. Specifically, in Table 6, if 'Number of CSI reference signals configured=8 (i.e., APs #15 to #22)' is configured as the representative (antenna port count/number) candidate used for CSI-RS transmission, since a total number of candidate locations in physical resource regions where CSI-RS signals are transmittable is restricted to 8, the number of bits for signaling the CSI-RS transmission locations in the physical resource regions may be reduced (i.e., '5 bits→3 bits').

According to another embodiment of the present invention, the number of bits required to transmit corresponding information (subframeConfig-r10, 8 bits) may be reduced by configuring specific ones of period/subframe offset configuration candidates selectable for CSI-RS transmission as representative candidates (e.g., even 1 period/subframe offset configuration candidate can be configured as a representative candidate) based on a predefined rule. For example, in Table 7, a total number of period/subframe offset configuration candidates selectable for CSI-RS transmission is 155 (i.e., 'CSI-RS-SubframeConfigs #0 to #154'). However, if specific period/subframe offset configuration candidates (i.e., 'CSI-RS-SubframeConfigs #0 to #4') are configured as representative candidates as proposed by the present invention, the number of bits required to transmit corresponding information may be reduced (i.e., '8 bits→3 bits').

Alternatively, in Table 7, some (or all) candidates having a specific CSI-RS transmission period among candidates selectable as period configurations for CSI-RS transmission may be configured as representative candidates (e.g., even candidates having the same period can have different subframe offset configurations $\Delta_{CSI-RS}$). Specifically, considering that a TRS transmission period is configured as 5 ms, in Table 7, only some (or all) candidates having a CSI-RS transmission period configurable as 5 ms may be configured as representative candidates (e.g., 'some (or all) candidates of CSI-RS-SubframeConfigs #0 to #4'). Here, even when at least one candidate having a specific CSI-RS transmission period is selected as a representative candidate, the number of bits required to transmit CSI-RS period/subframe offset configuration information may be reduced (i.e., '8 bits→3 bits').

The UEs having received CSI-RS configuration information (i.e., period/subframe offset) for configuring at least one candidate having a specific CSI-RS transmission period as a representative candidate, via the system information transmission channel (e.g., EPBCH or ESIB) may assume that control information of CSI-RS signals transmitted/received at a corresponding timing in the EPDCCH CSS/USS is transmitted/received using a PC or RM scheme based on a predefined rule, or transmitted/received using a PC or RM scheme signaled via the system information transmission channel.

According to another embodiment of the present invention, the number of bits required to transmit candidates selectable as CSI-RS transmit power configurations (i.e., ratios of PDSCH EPRE to CSI-RS EPRE (p-C), 5 bits) may be reduced by configuring specific p-C ratios as representative candidates (e.g., even 1 specific p-C ratio can be configured as a representative candidate) based on a predefined configuration.

For example, in Table 4 (i.e., CSI-RS-Config information elements), a total number of candidates selectable as CSI-RS transmit power configurations is 24 (i.e., 'Values in The Range of [−8, 15] dB with 1 dB Step Size'). However, if the specific p-C ratios are configured as representative candidates (i.e., 'Values in The Range of [−3, 3] dB with 1 dB Step Size') as proposed by the present invention, the number of bits required to transmit corresponding information may be reduced (i.e., '5 bits→3 bits'). Accordingly, the UEs having received CSI-RS configuration information (i.e., p-C) based on the scheme for configuring specific p-C ratios among the candidates selectable as CSI-RS transmit power configurations as representative candidates, via the system information transmission channel (e.g., EPBCH or ESIB) may assume that control information of CSI-RS signals transmitted/received based on the corresponding p-C ratios in the EPDCCH CSS/USS is transmitted/received using a PC or RM scheme based on a predefined rule, or transmitted/received using a PC or RM scheme signaled via the system information transmission channel.

According to another embodiment of the present invention, since CSI-RS configuration information is used to signal location information (or overhead) of CSI-RS signals in the EPDCCH CSS/USS to the UEs performing an initial access procedure, and to puncture or rate-match control information of the CSI-RS signals, by the eNB, information bits for legacy CSI-RS transmit power configurations (i.e., p-C, 5 bits) may be configured not to be used. That is, these bits may be configured as information bits for sort of Zero-Power CSI-RS configurations.

Accordingly, if the information bits for legacy CSI-RS transmit power configurations (i.e., p-C, 5 bits) are configured not to be used, the eNB may transmit corresponding CSI-RS configuration information to the UEs performing the initial access procedure via the system information transmission channel (e.g., EPBCH or ESIB) with relatively low signaling overhead.

As another example, when the information bits for legacy CSI-RS transmit power configurations are not used, a signal format used to transmit Zero-Power CSI-RS configuration information other than a signal format used to transmit legacy Non Zero-Power CSI-RS configuration information may be configured to be used.

Here, when the information bits for legacy CSI-RS transmit power configurations are configured not to be used, the above-described embodiments of the present invention are extensively applicable thereto and thus the number of bits required to transmit corresponding information may be reduced. For example, the above-described method for grouping candidate locations in physical resource regions where CSI-RS signals based on a specific antenna port count/number ('Number of CSI reference signals configured=4 (i.e., APs #15 to #18)') are transmittable, or the method for configuring representative period/subframe offset candidate(s) selectable for CSI-RS transmission are extensively applicable to the case in which the information bits for legacy CSI-RS transmit power configurations are configured not to be used.

The above-described embodiments of the present invention may be implemented separately or cooperatively, and are extensively applicable not only to a case in which UEs transmit information about CSI-RS signals transmitted in a monitored EPDCCH CSS/USS in an initial access procedure but also to a case in which an eNB (re)transmits configuration information of CSI-RS signals transmitted in the EPDCCH CSS/USS to the UEs having completed the initial access procedure.

The above-described embodiments of the present invention are extensively applicable to a case in which the eNB transmits configuration information of a default CSI-RS (the default CSI-RS refers to a predefined specific CSI-RS configuration for channel estimation or RRM (e.g., RSRP or RSRQ)) to the UEs via a predefined system information transmission channel (e.g., EPBCH or ESIB).

Furthermore, the above-described embodiments are extensively applicable to a case in which a serving eNB signals configuration information of CSI-RS signals transmitted in an EPDCCH CSS/USS of a neighboring eNB, to UEs performing handover through higher layer signaling.

Besides, the above-described embodiments are extensively applicable to a case in which a resource configuration (e.g., PRB pair basis) for a monitored EPDCCH CSS/USS in an initial access procedure is independently defined (or configured).

Additionally, a rule may be defined that the eNB signals the CSI-RS configuration information (having relatively low overhead) based on the above-described embodiments to the UEs (re)using spare bits of MIB transmitted via a legacy PBCH or EPBCH. Here, the spare bits of the MIB may be configured as 10 bits, i.e., 'CSI-RS transmission location in physical resource region (3 bits), antenna port count/number (1 bit), period/subframe offset (3 bits), and p-C(3 bits)' in the above-described embodiments.

Based on the above-described embodiments, the UEs may decode the punctured or rate-matched control information in consideration of CSI-RS signals transmitted in the EPDCCH CSS/USS in the initial access operation.

Furthermore, according to another embodiment of the present invention, the eNB may additionally signal current accurate CSI-RS configuration information to the UEs having completed the initial access procedure (e.g., UEs in RRC connected mode) through higher layer signaling (e.g., RRC signaling). The UEs having received the CSI-RS configuration information may decode the punctured or rate-matched control information in the EPDCCH CSS/USS based on the updated CSI-RS configuration information other than the previous CSI-RS configuration information.

Here, for example, when the eNB signals the updated CSI-RS configuration information to the UEs having completed the initial access procedure, the updated CSI-RS configuration information may be configured to be transmitted using the above-described CSI-RS configuration information transmission method which can be implemented with relatively low signaling overhead, or a legacy CSI-RS configuration information transmission method. Furthermore, if the updated CSI-RS configuration information is different from the previous CSI-RS configuration information, the UEs and the eNB reuse resources (e.g., resource elements (REs)) assumed as being punctured or rate-matched by CSI-RS signals in the initial access procedure, to transmit control information.

In addition, according to another embodiment of the present invention, the range of DCI in a CSS to which the above-described embodiments are applied may be restricted to DCI types which should be monitored for initial access or DCI types which should be monitored even when the UEs are in idle mode (i.e., DCI masked with SI-RNTI, P-RNTI and RA-RNTI) (here, DCI format 3/3A received in RRC connected mode may be an exception).

Mapping Excluding Resources for Specific Reference Signals in EPDCCH CSS

According to the present invention, UEs may be configured to assume that resources other than resources (e.g., resource elements (REs)) for transmitting pre-designated specific reference signals are used to transmit downlink control information (i.e., DCI-to-RE mapping).

Here, assuming that 'REs for actually transmitting specific reference signals' or 'an OFDM symbol including the REs for actually transmitting the specific reference signals' is indexed n, resources used to transmit the specific reference signals but not used to transmit control information may be defined as all REs corresponding to the OFDM symbol index n within a frequency resource region in which the predefined specific reference signals are transmitted (e.g., REs corresponding to the OFDM symbol index n but not included in the frequency resource region configured to transmit the reference signals can be used to transmit control information)'.

For example, time-frequency resource region configuration information of a CSS may be configured to be signaled from an eNB to the UEs via a pre-designated system information transmission channel (e.g., SIB or PBCH) or through higher layer signaling (i.e., RRC connected mode), or a specific time-frequency resource region may be configured to be used based on a predefined rule. Particularly, the method using the system information transmission channel or the predefined rule is effective when the UEs perform an NCT-based initial access operation.

Thus, according to an embodiment of the present invention, control information in an EPDCCH CSS resource region may be configured to be transmitted/received using an RM scheme in consideration of resources other than resources used to transmit predefined specific reference signals. That is, the resources not used to transmit control information in the EPDCCH CSS resource region may be configured as resources used to transmit at least one of DM-RS, TRS and CSI-RS signals. Here, like information about the types (e.g., DM-RS/TRS/CSI-RS) of the predefined (i.e., not used to transmit control information) specific reference signals in the EPDCCH CSS resource region, at least one of information about a time-frequency region for transmitting the TRS, CSI-RS configuration information (e.g., CSI-RS antenna port number/count) and DM-RS configuration information (e.g., DM-RS antenna port number/count, DM-RS overhead, DM-RS location information on NCT, etc.) may be configured to be signaled from the eNB to the UEs via a pre-designated system information transmission channel (e.g., SIB or PBCH) or through higher layer signaling (i.e., RRC connected mode) or may be configured to be assumed based on a predefined rule.

That is, if resources used to transmit specific reference signals are present in a CSS resource region to be ultimately blind-decoded by a UE at a specific timing, the UE may use (e.g., rate-match) only resources other than the resources used to transmit the specific reference signals, to decode control information.

According to another embodiment of the present invention, the specific reference signals may be configured to be transmitted by puncturing the control information in the EPDCCH CSS resource region and may be configured as, for example, at least one of TRS and CSI-RS signals. Here, resource configuration information (e.g., time-frequency location, antenna port number/count and overhead) of the specific reference signals may be configured to be signaled from the eNB to the UEs via the system information transmission channel (e.g., SIB or PBCH) or through higher layer signaling (i.e., RRC connected mode) or may be configured to be assumed based on a predefined rule, differently from reference signals configured to transmit/receive control information using an RM scheme. In this case, the resource configuration information of the specific reference signals may be configured to be signaled from the eNB to the UEs via the system information transmission channel (e.g., SIB or PBCH) or through higher layer signaling (i.e., RRC connected mode) or may be configured to be assumed based on a predefined rule, together with the information about the types of the specific reference signals, independently from the reference signals configured to transmit/receive control information using an RM scheme.

Accordingly, if resources used to transmit specific reference signals are present in a CSS resource region to be blind-decoded by a UE at a specific timing, the UE may ultimately decode control information considering that the control information in the corresponding resource region is punctured.

Furthermore, in an LTE system, CSI-RS signals are not transmitted in i) special subframe(s) in the case of a TDD system, ii) subframes where transmission of a CSI-RS would collide with transmission of synchronization signals, PBCH, or SystemInformationBlockType1 messages, and iii) subframes configured for transmission of paging messages for any UE with the cell-specific paging configuration, and the UEs do not assume CSI-RS transmission in these subframes. Accordingly, when NCT-based communication is performed, resources configured for CSI-RS transmission may be configured to be used to transmit control information (e.g., EPDCCH CSS) (i.e., DCI-to-RE mapping) exceptionally in the above-described subframes having characteristics i), ii) and iii).

Accordingly, resources configured for CSI-RS transmission may be (re)used for control information transmission only in the above-described subframes having characteristics i), ii) and iii), and may not be used for control information transmission in subframes other than the above-described subframes.

Mapping Excluding Resources for Specific Signals in EPDCCH CSS

In the present invention, UEs may be configured to assume that resources other than resources for transmitting pre-designated specific signals (or channels) are used to transmit downlink control information (i.e., DCI-to-RE mapping). Here, assuming that 'REs for actually transmitting specific signals (or channels)' or 'an OFDM symbol including the REs for actually transmitting the specific signals (or channels)' is indexed n, resources used to transmit the specific signals (or channels) but not used to transmit control information may be defined as all REs corresponding to the OFDM symbol index n within a frequency resource region in which the predefined specific signals (or channels) are transmitted (e.g., REs corresponding to the OFDM symbol index n but not included in the frequency resource region configured to transmit the specific signals (or channels) can be used to transmit control information)'.

According to an embodiment of the present invention, resources not used to transmit control information in an EPDCCH CSS resource region may be configured as resources used to transmit at least one of synchronization signals (e.g., PSS and SSS) and PBCH signals (or channels). Accordingly, when DCI-to-RE mapping is performed on the resources other than the resources for the specific signals or the specific channels, for example, information about the types of the specific signals (or channels) for transmitting control information using an RM or PC scheme, or resource configuration information of the defined specific signals (or channels) (e.g., time-frequency location and antenna port number/count/overhead of reference signals used for decoding) may be acquired by the UEs (re)using the signal schemes described above in relation to the method for excluding the resources for the specific reference signals in the EPDCCH CSS.

The eNB and the UEs performing NCT-based communication receive a large amount of interference from PDCCH channel regions of legacy cells or CCs (e.g., case in which the NCT and the legacy cells or CCs use the same-location band). Furthermore, for example, in the case of NCT, low-density CRS signals (i.e., TRS) (of pre-configured frequency domain locations or periods) are transmitted other than (high-density) CRS signals which are transmitted in a legacy downlink system bandwidth, and thus legacy PDCCH channels requiring CRS-based decoding may not be easily implemented. Accordingly, EPDCCHs based on DM-RS decoding may be useful in the NCT, and a start OFDM symbol location of a corresponding EPDCCH resource region (e.g., EPDCCH CSS/USS) may be appropriately configured to mitigate the above-described interference received from the PDCCH channel regions of the legacy cells or CCs.

According to another embodiment of the present invention, the start OFDM symbol location of the EPDCCH resource region (e.g., EPDCCH CSS/USS) may be configured to be equally assumed as a start OFDM symbol location of DM-RS based EPBCH transmitted in the NCT, to be checked by the UEs through blind decoding on start OFDM symbol location candidates of a predefined EPDCCH resource region, or to be assumed as a fixed OFDM symbol location based on a predefined rule. Alternatively, the start OFDM symbol location of the EPDCCH resource region (e.g., EPDCCH CSS/USS) may be configured to be regarded as the lowest value of OFDM symbol indexes associated with REs used to transmit pre-designated specific reference signals (e.g., DM-RS), or a value calculated by reflecting a pre-designated/signaled offset value in the corresponding value, or regarded as the lowest value of OFDM symbol indexes associated with REs used to transmit specific reference signals used to decode pre-designated specific signals (e.g., EPBCH), or a value calculated by reflecting a pre-designated/signaled offset value in the corresponding value. Furthermore, the eNB may be configured to signal the OFDM symbol location of the EPDCCH resource region to the UEs via a pre-designated system information transmission channel (e.g., PBCH or SIB) or through higher layer signaling (i.e., RRC connected mode).

Alternatively, as another method for signaling the OFDM symbol location of the EPDCCH resource region, the UEs may be configured to determine a predefined value capable of stable EPDCCH reception (e.g., the fourth OFDM symbol of the first slot) as the start OFDM symbol location of the EPDCCH resource region to receive control information in consideration of interference received from the PDCCH channel regions of the legacy cells or CCs in an NCT-based initial access procedure, and to update the start OFDM symbol location based on information signaled from the eNB through higher layer signaling after the initial access procedure is completed (e.g., RRC connected mode).

Here, the start OFDM symbol location information capable of capable of stable EPDCCH reception may be configured to be signaled from the eNB to the UEs via the pre-designated system information transmission channel (e.g., SIB or PBCH) or to be assumed as a fixed value based on a predefined rule.

In consideration of the start OFDM symbol location information of the EPDCCH resource region acquired as described above based on an embodiment of the present invention, the UEs may receive control information transmitted in the corresponding EPDCCH CSS. Here, control information prior to the start OFDM symbol location may be configured to be punctured, or control information may be configured to be rate-matched to a corresponding valid resource region on the assumption that only a subsequent resource region including the start OFDM symbol location is usable to transmit control information. Furthermore, information about EPDCCH CSS configuration may be configured to be signaled from the eNB to the UEs via the pre-designated system information transmission channel (e.g., SIB or PBCH), or a specific method may be selected based on a predefined rule.

Additionally, when a UE performs handover from a legacy cell or CC- or NCT-based serving eNB to another NCT-based neighboring eNB based on a specific reference signal based RSRP measurement value, the UE should perform an initial access operation (e.g., RACH transmission and SIB/PBCH reception) toward the neighboring eNB.

Here, when the UE performs the initial access operation toward the neighboring eNB, since some channels/signals can be transmitted based on an EPDCCH CSS of the neighboring eNB, the serving eNB may signal at least one of information about a start OFDM symbol location of an EPDCCH resource region (e.g., EPDCCH CSS/USS) of the neighboring eNB received via a predefined channel (e.g., X2 interface), resource configuration information of specific reference signals (e.g., DM-RS and TRS) and specific signals (or specific channels, e.g., PBCH) of the neighboring eNB, resource configuration information (e.g., time-frequency location, antenna port number/count, overhead) of reference signals used to decode the specific signals (or specific channels, e.g., PBCH) of the neighboring eNB, type information or resource configuration information (e.g., time-frequency location, antenna port number/count, overhead) of specific reference signals and specific signals (or channels) excluded from resources used to transmit control information from the neighboring eNB, RM/PC information, and information transmitted via EPBCH (e.g., MIB) of the neighboring eNB (e.g., EPDDCH CSS/USS information) to the UE together with signaling (e.g., RRC signaling) related to handover.

FIG. 22 is a block diagram of a BS 110 and a UE 120 applicable to an embodiment of the present invention. If a wireless communication system includes a relay, backhaul link communication is performed between the BS 110 and the relay and access link communication is performed between the relay and the UE 120. Accordingly, the BS 110 or the UE 120 may be appropriately replaced with the relay.

Figure 10:
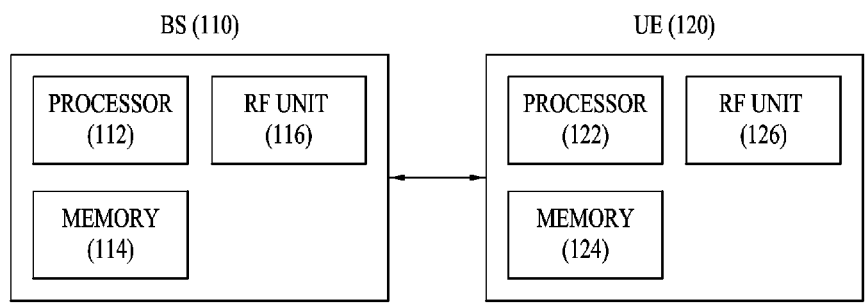
FIG. 10 is a block diagram of a base station (BS) and a UE applicable to an embodiment of the present invention.

Referring to FIG. 10, the wireless communication system includes the BS 110 and the UE 120. The BS 110 includes a processor 112, a memory 114, and a Radio Frequency (RF) unit 116. The processor 112 may be configured to perform procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may have a single antenna or multiple antennas.

The embodiments of the present invention described above are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for receiving downlink control information in a wireless communication system, and an apparatus therefor, according to the present invention, are applied to a 3GPP LTE system in the above description, the present invention is applicable to various wireless communication systems as well as the 3GPP LTE system.

The invention claimed is:

1. A method for receiving downlink control information by a first user equipment (UE) in a wireless communication system, the method comprising:
    configuring a start OFDM (Orthogonal Frequency Division Multiplexing) symbol location of a common search space (CSS) in an initial access procedure; and
    monitoring an enhanced physical downlink control channel (EPDCCH) on the CSS,
    wherein the CSS includes a specific reference signal and downlink control information of the EPDCCH,
    wherein, if a specific location allocated to the first UE in the initial access procedure is not commonly applicable to a second UE, the specific reference signal is mapped on resource elements excluding the specific location through a puncturing,
    wherein the downlink control information of the EPDCCH is allocated through a rate matching to a subframe excluding the resource elements to which the specific reference signal is mapped, and
    wherein the downlink control information is first allocated from the start OFDM symbol location toward a last OFDM symbol of the subframe and then allocated from the start OFDM symbol location toward an initial OFDM symbol of the subframe.

2. The method according to claim 1, wherein the specific reference signal is a channel state information reference signal (CSI-RS).

3. The method according to claim 2, further comprising performing channel measurement based on the CSI-RS and transmitting a resultant value of the channel measurement.

4. The method according to claim 1, wherein the specific reference signal is a CSI-RS pre-configured for channel estimation or radio resource management (RRM).

5. The method according to claim 1, further comprising:
    receiving configuration information of the specific reference signal.

6. The method according to claim 1, wherein the specific reference signal is transmitted using a rate matching (RM) scheme if the specific location allocated to the first UE in the initial access procedure is commonly applicable to the second UE.

7. A user equipment (UE) for receiving downlink information in a wireless communication system, the UE comprising:
    a radio frequency (RF) unit; and
    a processor,
    wherein the processor is configured to:
        configure a start OFDM (Orthogonal Frequency Division Multiplexing) symbol location of a common search space (CSS) in an initial access procedure, and
        monitor an enhanced physical downlink control channel (EPDCCH),
    wherein the CSS includes a specific reference signal and downlink control information of the EPDCCH, wherein, if a specific location assigned to the UE in the initial access procedure is not commonly applicable to another UE, the specific reference signal is mapped on resource elements excluding the specific location through a puncturing, wherein the downlink control information of the EPDCCH is allocated through a rate matching to a subframe excluding the resource elements to which the specific reference signal is mapped, and wherein the downlink control information is first allocated from the start OFDM symbol location toward a last OFDM symbol of the subframe and then allocated from the start OFDM symbol location toward an initial OFDM symbol of the subframe.

* * * * *